United States Patent [19]

Cavanagh

[11] 4,009,298
[45] Feb. 22, 1977

[54] METHOD OF CURING PLASTIC COATINGS ON BOTTLES

[75] Inventor: Joseph C. Cavanagh, Bay Shore, N.Y.

[73] Assignee: Midland Glass Company, Inc., Cliffwood, N.J.

[22] Filed: Mar. 6, 1975

[21] Appl. No.: 555,852

[52] U.S. Cl. .................................. 427/55; 34/105; 65/118; 118/324; 427/33; 427/379; 427/385 A

[51] Int. Cl.² .......................................... B05D 3/06

[58] Field of Search ............ 427/55, 372, 379, 385, 427/424, 425, 33, 195; 118/643, 503, 324, 49.1, 69, 50.1; 65/118, 60 R, 60 B; 250/453, 503, 504; 34/105

[56] References Cited

UNITED STATES PATENTS

| 3,734,765 | 5/1973 | Russell et al. | 65/60 B |
|---|---|---|---|
| 3,887,729 | 6/1975 | Cavanagh | 427/195 |
| 3,895,126 | 7/1975 | Strauss et al. | 427/195 |
| 3,901,180 | 8/1975 | Allen et al. | 118/7 |
| 3,902,453 | 9/1975 | Frische | 65/60 R |

*Primary Examiner*—John H. Newsome
*Attorney, Agent, or Firm*—McAulay, Fields, Fisher & Goldstein

[57] ABSTRACT

In the coating of glass containers with a plastic film, the curing of the applied plastic film to the container is an extremely important phase of the overall process. Generally, the most economical method of achieving cure is to carry a plurality of the bottles through an oven where the curing operation is accomplished, the bottles being carried on a moving belt. In order to allow such containers to be carried on the moving belt, the base must achieve a partial cure, prior to being placed on the conveying means for passage through the oven. In accordance with the present invention, means and a method are disclosed for providing a sufficient cure of the coated container base to allow for final curing in the oven.

7 Claims, 2 Drawing Figures

METHOD OF CURING PLASTIC COATINGS ON BOTTLES

CROSS-REFERENCE TO RELATED APPLICATIONS

This application is related to the copending application of Joseph C. Cavanagh, Ser. No. 415,972, filed Nov. 15, 1973, for "Method for Coating Glass Containers" now U.S. Pat. No. 3,887,729.

BACKGROUND OF THE INVENTION

As evidenced by a large number of patents issuing recently, the coating of glass containers with plastic is becoming increasingly more prevalent. These coatings are applied for a wide variety of reasons, including protection of the pristine strength of the glass, prevention of the scattering of glass shards on shattering etc. In many of the prior art patents, this plastic coating is applied as a sheath which is wrapped about or shrunk onto the glass container. However, frequently, the best method of applying the plastic coating to the bottle involves some process other than application of a sheath or wrap of, essentially, precured plastic.

In the copending application, previously referred to, a method for application of an uncured plastic to a glass container is described. In accordance with this method, as set forth in that application, the plastic is applied while the container is attached to one work holder, while that coating is cured while the container is attached to a different work holder. The purpose is to prevent fouling of the first work holder with cured plastic. While the process described in that application is entirely adequate, and solves a real problem relating to the application of plastic coatings to glass containers, it does not deal with the specific treatment of the coated glass container after it is transferred from the first to the second work holder.

In general, the most efficient method and apparatus for curing of the plastic coated glass container is a heated oven where a plurality of coated glass containers may be passed through the oven in successive ranks. Employing such a method and apparatus, the coating on a plurality of glass containers are simultaneously, and gradually brought to a complete cure. The most effective method for conveying the coated glass containers through a curing oven, of the type referred to, is on a continuous, moving belt upon which the coated glass containers rest. However, if the containers are directly transferred from the first work holder of previously referenced application Ser. No. 415,972, to the second work holder, which, in this case, would consist of the continuous, moving belt, then curing of the plastic coating in the oven would include curing of the plastic coating on the bottom of the container to the continuous moving belt. In such a situation, either the coating on the bottom of the glass container would not be fully cured, or the cure would be such as to effectively bond the glass container to the continuous moving belt, so that removal of the container from the belt would involve damage to the coating, thus effectively defeating the purpose of the coating.

As previously indicated, in general, the most efficient method and apparatus for curing the plastic coating onto the glass container is by continuously moving it through an oven. While means exist for curing of such a plastic coating outside of a continuous oven, they are inefficient, and, in general, require inordinate amount of space and energy.

Accordingly, it is desirable to provide a method to allow for effective curing of a plastic coating on a glass container so that it can be completely cured in a continuous oven.

BRIEF DESCRIPTION OF THE INVENTION

In accordance with the present invention, a method has unexpectedly been discovered which allows for the complete cure of a plastic coating onto a glass container in a continuous oven, where the glass container is moved through the oven on a continuous, moving belt, without curing of the container and its coating to the belt. The method takes advantage of the system described in afore-referenced U.S. patent application Ser. No. 415,972, that disclosure being herein incorporated by reference.

Specifically, in accordance with the present invention, a glass container is first coated with a plastic which must be cured to the container. This coating is accomplished on a first work holder, but, prior to cure, the coated container is removed from that work holder which may then be cleaned as described in the afore-referenced U.S. patent application. The coated container, with the plastic uncured, is then transferred to a second work holder of the type referred to in the afore-referenced U.S. patent application. As indicated in that application, this second work holder can grasp the coated container about the neck, or finish portion. The coated container, with uncured plastic, is then led along an intermediate path, before being transferred to the continuous curing oven. Specifically, the container can be grasped at the neck, or finish portion, and led through curing means which act to cure the plastic on the heel, or rim portion of the container. Since, in general, this cure is accomplished through use of heat, the container is led through apparatus providing for rapid cure of the plastic on this portion of the container through application of intensive heat. Particularly, infrared lamps, such as quartz panels, have been found particularly effective for this purpose. The heat generating source is so directed, and has sufficient energy, to provide adequate heat for a partial cure of the plastic in the heel, or rim portion.

After sufficient heat is applied to the rim portion of the container to cure the plastic in that area, the coated container is allowed to cool to a sufficient degree so as to harden the plastic in the rim area. This can be accomplished by conducting the coated container at ambient conditions along a path which is sufficiently long. The container is then readily transferable to a moving belt on which the base of the container can be placed. Normally, such moving belts contain rows of such containers which are continuously passed through such an oven in order to cure the remainder of the coating.

In some cases, it may be desirable to transfer the containers which have been rim-cured relative to the plastic coating onto a first moving belt which will carry them to the moving belt which will carry them through the curing oven. Stacking equipment, as well known in the art, can be employed for transfer of the containers from the first moving belt to the second moving belt.

DESCRIPTION OF THE PREFERRED EMBODIMENTS

Figure 1:
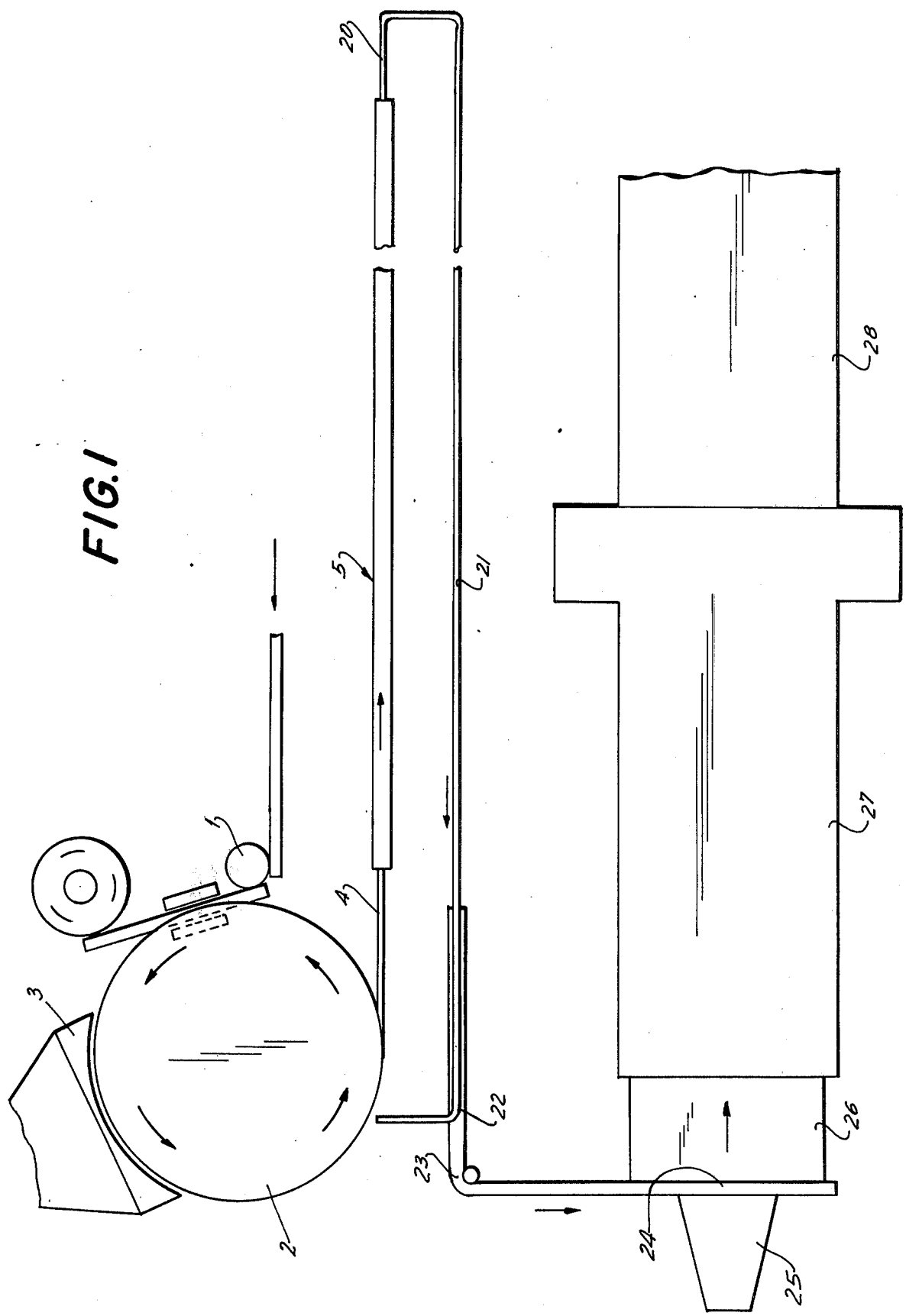
FIG. 1 is a schematic plan view of equipment employed for coating of a glass container with plastic, rim-curing of the plastic on the container, cooling of the rim-cured material and transfer of the rim-cured containers to a curing oven.

Referring to the accompanying drawings, glass containers 1, which are either virgin glass or glass which has been subjected to a previous coating operation, such as one for abrasion resistance, are placed on a carousel or round table conveyor 2. The prior treatments which may be applied to the containers 1 include those for abrasion protection, such as are described in Carl et al., U.S. Pat. No. 3,323,889, or Scholes et al., U.S. Pat. No. 3,420,693. These patents generally describe the application of thin layers of metallic compound, followed by equally thin layers of a lubricating material. As indicated, such treatments may be applied to the glass containers which are to be coated in accordance with the present invention, prior to application of the plastic coating.

The containers 1 are carried by the carousel 2 in a manner indicated in the afore-referenced application Ser. No. 415,972, past a coating station 3 where a coating of dry plastic is applied to so much of the container as is desired. Generally, the bottom or rim portion of the container is so coated, as is at least a portion of the container side-wall. The coated containers from the carousel 2 are carried to a conveyor 4 which is generally of a type bearing a work holder, not illustrated, which will grasp the container at the neck, or finish portion. The coated containers on this conveyor are conducted through a rim-curing section 5, where intense heat is applied to the rim of the bottle so as to cure the plastic coating in that area.

Figure 2:
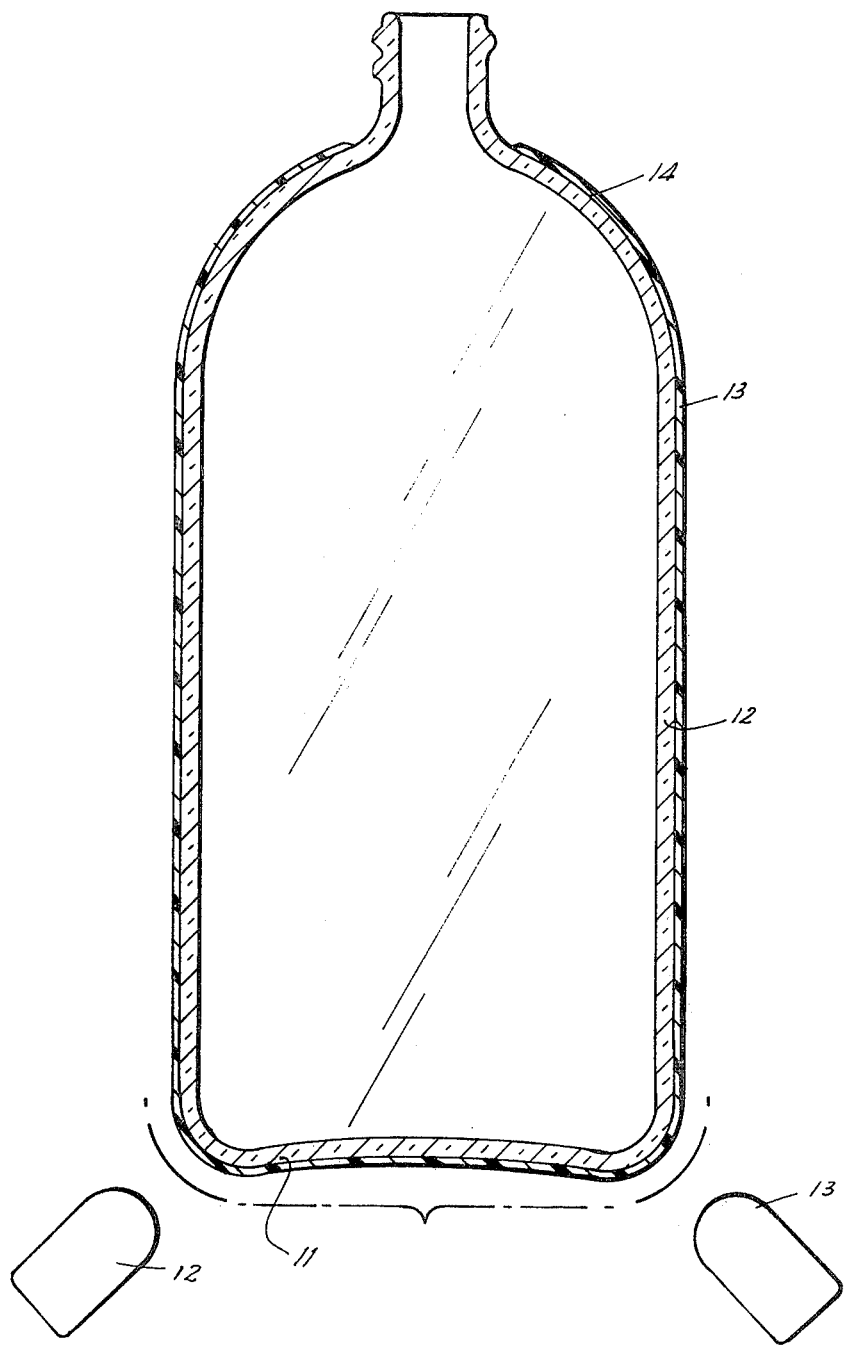
FIG. 2 is a cross-sectional view of the coated container being rim-cured.

As indicated in FIG. 2, this rim cure can be accomplished through the use of two rows of means for directing intense heat at the portion of the container 10 which represents the transition between the heel portion 11 and the sidewall portion 12. Illustrative of means for accomplishing this intense heating, the heat being intense enough to fuse the plastic in this portion of the container, are infrared lamps. A particularly desirable form of infrared lamp is a quartz panel. However, in addition, other means for generating and directing intense heat at this portion of the coated container, including Calrod high resistance heating units, etc., can equally be employed.

The positioning of the heater means, as illustrated by 12 and 13, is such as to provide a rim-curing of the plastic coating, in particular, the plastic on the heel portion 11 of the container and a small part of the plastic on the lower portion of the side-wall 12. The coated areas 13 on the upper portion of the side-wall, and 14, nearest the finish, are generally uncured in passing through section 5. If some slight amount of cure of this plastic does occur, it is not critical to further processing of the coated container.

The coated container, with the plastic in the rim area now sufficiently heated to accomplish a cure of the plastic, remains on section 20 of conveyor 4, after leaving the heating area 5. The containers remain on this section 20 and section 21 of the conveyor, at ambient conditions, for a sufficient period of time to accomplish cooling of the rim area, thus essentially completing the cure of the plastic in that area.

At position 22, the coated containers are transferred to a moving belt 23, normally in such a manner that the containers now rest upon their cured rims. The containers are carried by this conveyor 23 to station 24 where a stacker 25 moves rows of bottles onto a wide conveyor belt 26 to carry them through a curing oven 27 where curing of the remaining plastic coating is accomplished. The containers with the now cured plastic continue on section 28 of conveyor 26, after leaving the oven, and are carried to further processing equipment, as desired. For example, the containers can be loaded directly into cases for shipment or storage, or can, as desired, be treated with additional materials, or be conducted through labeling equipment. Such subsequent processing forms no part of the present invention.

Though specific equipment has been shown and described for carrying out the process of the present invention, it is apparent that variations are possible while remaining within the spirit and scope of the present invention. The critical factor of the process of the present invention is that a container is first coated with a plastic material which requires curing, the coated container is grasped near the neck or finish portion in an area where none of the plastic has been applied, the thus held container is carried through apparatus which will accomplish a rim cure of the plastic on the heel and immediately adjacent portions, and the rim-cured container is transferred to further equipment to complete the cure of the plastic coating. As indicated, the rim cure of the plastic on the heel and immediately adjacent portions is best accomplished by directing high-intensity heat at the transition portion of the container. This high-intensity heat is best provided by radiation heating equipment, such as infrared lamps, quartz panels, and Calrod high resistance heating units. Other forms of equipment which will provide the same high-intensity heating at a level sufficient to fuse the plastic coating in this area can equally well be used. Two rows of the high-intensity heating, particularly directed at the transition portion of the container, have been found to provide the best method of accomplishing this form of heating and fusing of the plastic. With curing in these areas, the containers can be placed upon their heels on moving belts to accomplish cure of the remainder of the coating. Use of high-intensity equipment for curing of the entire plastic coating on the container would not only require an excessive length of conveyor, but would consume energy in such quantities as to be both wasteful and inefficient.

Having thus described the invention, it is apparent that it should not be limited to the specific details as illustrated and described, but only as limited by the appended claims.

What is claimed as new and desired to be secured as Letters Patent is:

1. A process for curing of a plastic coating on a glass container comprising:
  a. conveying a glass container, having a coating of uncured plastic at least on its rim portion, said rim portion including its heel portion and the lower portion of its sidewall, supported from the neck portion, through an area where high-intensity heat is applied to the rim portion of the container;
  b. conveying said container through an area wherein said heated plastic portion is allowed to cool;
  c. transferring said container to a conveyor which supports said container from its heel portion; and d. conveying said container through an area where cure of the remainder of the plastic coating is accomplished.

2. The process of claim 1 wherein the cure of the remainder of the plastic coating is accomplished in a curing oven.

3. The process of claim 1 wherein said container is transferred to a first moving belt and is conveyed to a second moving belt, said second moving belt conveying said coated container through an area where cure of the remainder of the plastic coating is accomplished.

4. The process of claim 3 wherein the cure of the remainder of the plastic coating is accomplished in a curing oven.

5. The process of claim 1 where said high-intensity heat is applied to the rim of said coated container employing infrared lamps.

6. The process of claim 1 wherein said high-intensity heat is applied to the rim of said coated container employing quartz panels.

7. The process of claim 1 wherein said high-intensisity heat is applied to the rim of said coated container employing high resistance heating units.

* * * * *